Figure 1:
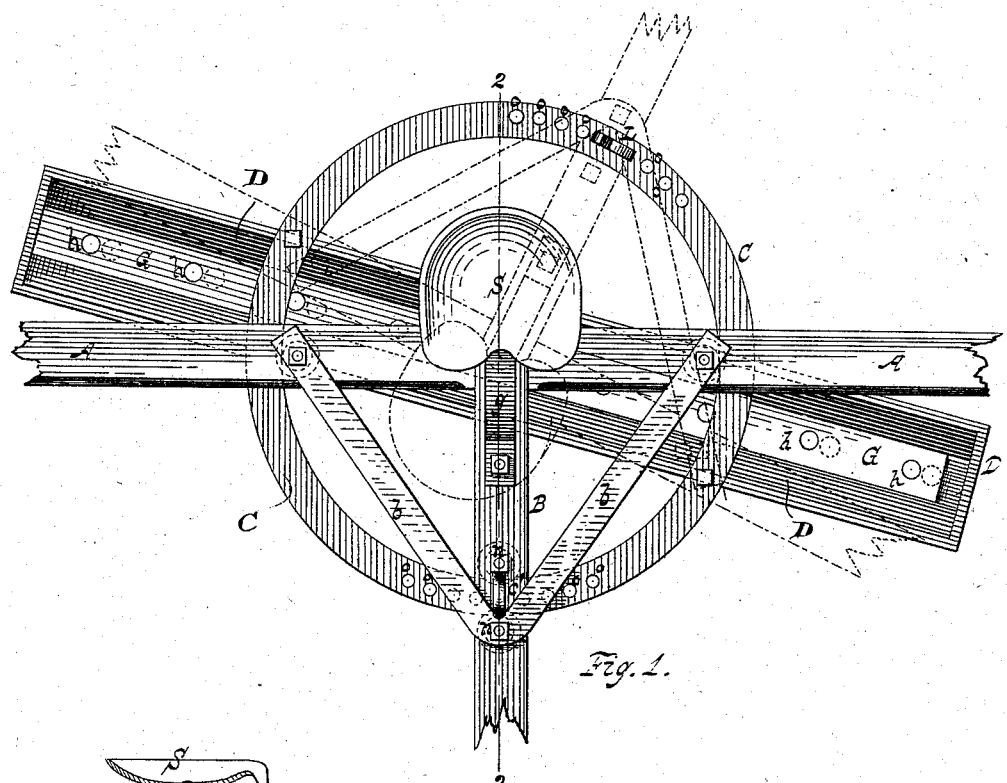

C. La DOW.
Combined Seeder and Cultivator.

No. 226,233. Patented April 6, 1880.

Witnesses. Inventor.
Wm A. Strickly, Charles La Dow.
Geo. W. Beck. By his Attorneys,
Baldwin, Hopkins & Peyton

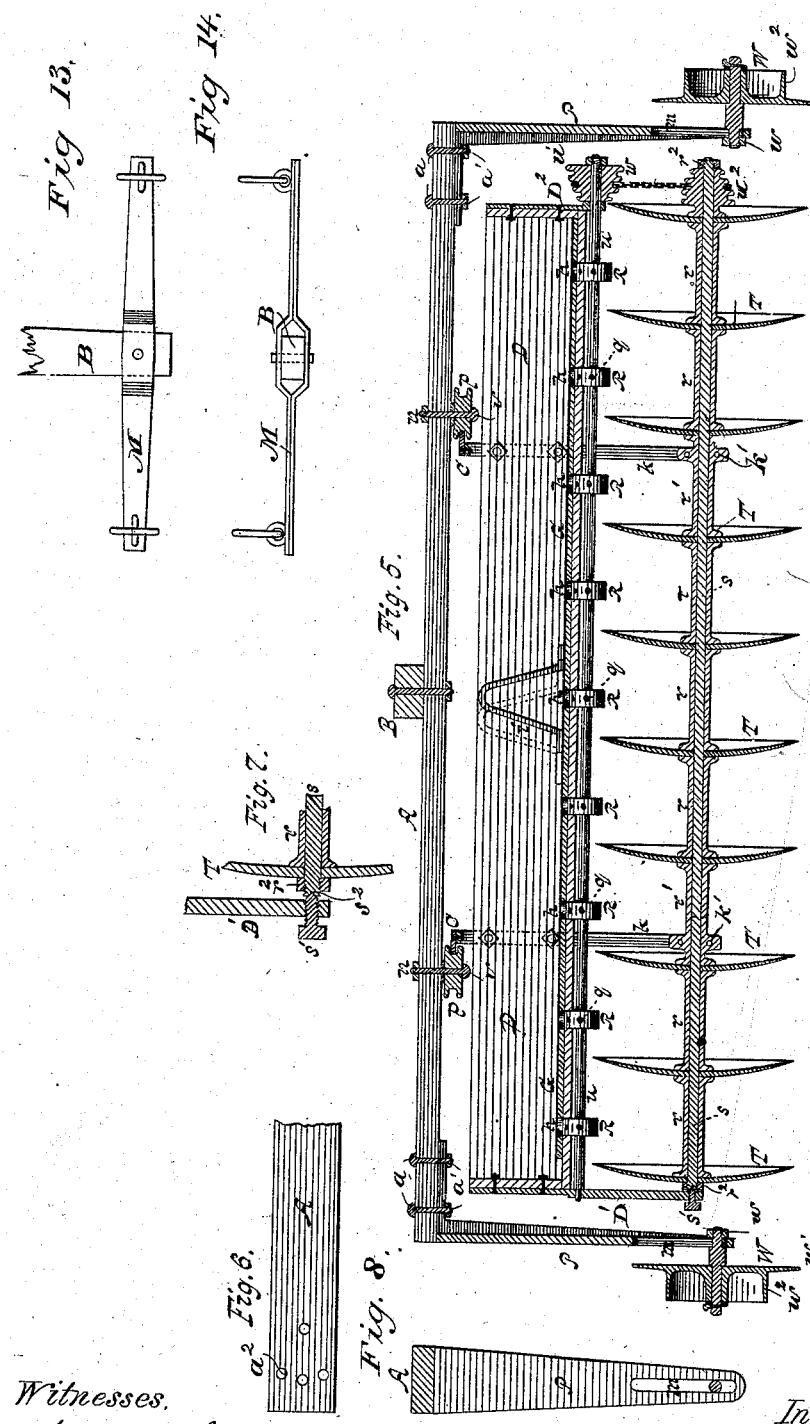

3 Sheets—Sheet 3.
C. La DOW.
Combined Seeder and Cultivator.
No. 226,233. Patented April 6, 1880.
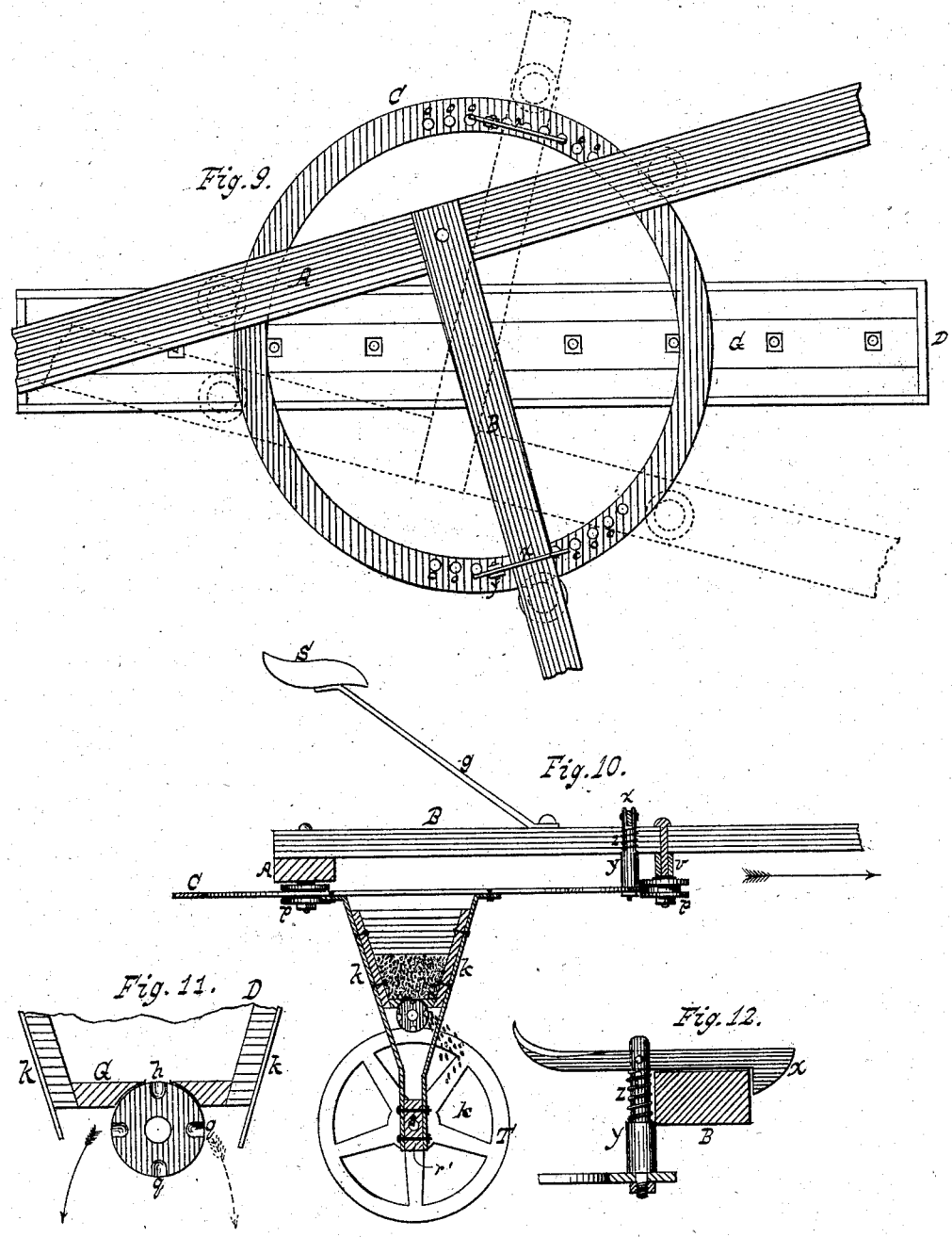

United States Patent Office.

CHARLES LA DOW, OF ALBANY, NEW YORK.

COMBINED SEEDER AND CULTIVATOR.

SPECIFICATION forming part of Letters Patent No. 226,233, dated April 6, 1880.

Application filed November 7, 1879.

*To all whom it may concern:*

Be it known that I, CHARLES LA DOW, of the city and county of Albany, and State of New York, have invented certain new and useful Improvements in Combined Seeders and Disk-Cultivators, of which improvements the following is a specification.

My invention relates to that class of wheel or disk cultivators in which a gang of disk-cutters is arranged to work at an angle to the line of draft.

The object of the first part of my invention is to counteract the lateral thrust of a gang of disk-cutters arranged at a common angle to the line of draft; and to this end my invention consists in combining a main or draft frame, a gang of disk-cutters adjustable relatively to the line of draft, and guides likewise adjustable in an opposite direction, so that the pressure of the guides in the ground may counteract that of the cutters.

The object of the next part of my invention is to dispense with the necessity of reversing or turning the cutters around at the end of each furrow, and to turn the furrows in a uniform direction both on the forward and reverse movement of the machine; and to this end my invention consists in combining a gang of disk-cutters arranged at the same angle to the line of draft with a reversible draft-frame.

The object of the next part of my invention is to support the draft-frame properly, to prevent its upsetting during the operation of reversing or turning it around; and to this end my invention consists in combining a gang of disk-cutters, a reversible draft-frame, and suitable supporting-wheels.

The object of the next part of my invention is to regulate the width of the furrows and to turn them in a uniform direction; and to this end my invention consists in combining a gang of disk-cutters, a reversible draft-frame, and mechanism for adjusting the angle of the disk-gang relatively to the line of draft.

The object of the next part of my invention is to provide a simple and secure means of locking the draft-frame in any desired position; to which end my invention consists in combining a gang of disk-cutters, a reversible draft-frame, a circular track, upon which the frame turns, suitable adjustable stops to vary the point from which the frame starts, and stops in reversing relatively to the disk-gang, and a locking-pin to hold the disk-gang and frame in the position desired.

The object of the next part of my invention is to firmly secure the reversible frame and circular track together; to which end my invention consists in combining a gang of disk-cutters, a reversible draft frame, a circular track, and pulleys which traverse the track.

The object of the next part of my invention is, in a cultivator of this class, to provide suitable seed distributing or feeding apparatus adjustable with a gang of disk-cutters; and to this end my invention consists in combining a main frame, a seed-box supported beneath the frame, a disk-gang shaft revolving in bearings depending from the seed-box, and mechanism for simultaneously adjusting the angle of the seed-box and disk-gang relatively to the frame and to the line of draft, a gang of disk-cutters extending the entire width of the machine, (adjustable relatively to the line of draft,) and a seed-box and seed-wheels, both adjustable with said cutters.

The object of the next part of my invention is to secure the uniform distribution of the seed during the forward as well as the reverse movement of the machine; to which end my invention consists in combining a gang of disk-cutters, a seed-box, a series of seed-wheels capable of working in either direction, a reversible or turning main frame, and mechanism for driving the seed-wheels in either direction from the disk-shaft.

The object of the next part of my invention is to secure a thorough pulverization of the soil; and to this end my invention consists in mounting a gang of spoked or perforated disk-cutters on a common axle, so as to revolve together at such an angle to the line of draft that the earth passes in succession laterally through the disks and between the spokes of each disk behind the one by which it was first turned up.

The object of the next part of my invention is to provide means for adjusting a gang of spoked or perforated disk-cutters relatively to each other; and to this end my invention consists in mounting a gang of perforated or spoked disk-cutters upon a common shaft, with thimbles between the disks and clamp-nuts upon the ends of the shaft to clamp the disks together with their spokes in the proper relation to each other.

The accompanying drawings represent my improvements as embodied in a machine in the best form now known to me. Obviously, however, the parts may be varied in various well-known ways and their details of construction changed within certain limits without departing from the spirit of my invention.

Figure 2:
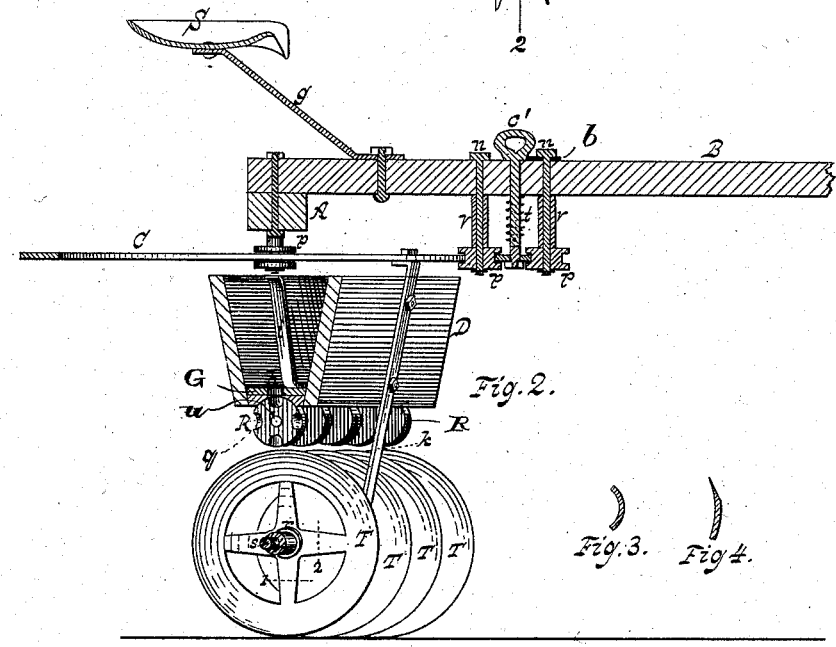
Figure 3:
Figure 4:

Figure 1 is a plan or top view of a portion of my improved machine with the reversible main frame and tongue partly broken away, showing in dotted lines the machine in the reversed position. Fig. 2 is a vertical section through the machine on the line 2 2 of Fig. 1. Fig. 3 is a section of one of the spokes of the disks on the lines 1 2 of Fig. 2. Fig. 4 is a section of the rim of one of the disks. Fig. 5 is a transverse section on a line drawn through the center of the seed-box and reversible main frame when they are arranged in the same transverse line. Fig. 6 is a detail view of one end of the transverse bar of the reversible frame. Fig. 7 is a detail sectional view of one end of the disk-gang shaft, showing one of the disks and the adjustable stop that receives the lateral thrust of the gang-shaft. Fig. 8 is a detail view of one of the supporting-standards of the reversible main frame. Fig. 9 is a plan or top view of a modification of the mechanism shown in Fig. 1. Figs. 10 and 11 are vertical sectional views, showing the operation of the seed-feeding devices, and Fig. 12 is a detail sectional view, showing a modification of the adjusting device for changing the angle of the tongue relatively to the disk-gang. Figs. 9, 10, and 12 represent different views of the same organization of mechanism. Figs. 13 and 14 are detail views of the end of the tongue and neck-yoke.

The main or draft frame of the machine is shown in this instance as composed of a cross-bar, A, supported at each end by a standard, P, secured thereto by means of bolts and nuts $a$ $a'$. These supports are slotted vertically at their lower ends, and carry gage, marking, or supporting wheels W, the axles of which are securely locked to the standards by means of nuts $w$. The height of the frame from the ground can be varied by adjusting the wheels in the vertical slots in the supports.

The cross-bar A has at each end a series of holes, $a^2$, through which clamping-bolts pass, the outer ones in each case being arranged radially relatively to the inner one. (See Fig. 6.) By this means the standards or supports P may be shifted, and consequently the wheels W may be placed at varying angles relatively to the line of draft, for a purpose hereinafter to be explained. The draft-pole or tongue B is bolted to the cross-bar, and is securely braced by rods $b$ $b$. These wheels W are provided with sharp flanges $w'$ and a bearing-surface or tread, $w^2$, for a purpose which will hereinafter fully appear.

Beneath the cross-bar A is a seed-box, D, which carries upon its upper side a circular track, C. This track is connected with the main frame by means of grooved pulleys $p$, which embrace the edges of the track, mounted on suitable hangers $v$, depending from the cross-bar and tongue. It is best in practice to have these pulleys both on the interior and exterior edges of the circular track. A single pulley running in a groove in the edge of the track might be used, if preferred. This track is provided with a series of holes, $o$, on each side of the seed-box. (See Fig. 9.) Suitable notched stops L are made so as to be capable of being secured in any of the holes in the track. A spring locking-pin, C′, Fig. 2, projects down from the tongue of the machine in such manner as to enter the notches in the stop when they are brought directly under it.

Instead of the notches $o$, a continuous slot might be made in the track.

It will be seen that by this construction the main frame can revolve independently of the seed-box and parts connected therewith, and can be locked in any desired position relatively thereto.

The locking-pin C′ is within easy reach of the driver's seat S, which is mounted upon the main frame. It is obvious that the locking-pin might be controlled by a foot-lever from the driver's seat in usual well-known ways.

The disk-gang shaft $s$ has its bearings in suitable bars $k$, extending down from the seed-box. The cutters or disks are loosely mounted upon this shaft, and are kept at suitable distances apart by spacing-thimbles $r$. The thimbles $r'$ $r'$ are slightly flattened, and are securely clamped between the bars K by means of screw-bolts $k'$, thus forming journal-bearings for the gang-shaft $s$. Upon each end of this shaft there is a clamp-nut, $r^2$. By first loosening the bolts $k'$ the disks, thimbles, and axle can all be firmly united by screwing up these clamp-nuts. A bar, D′, extends from one end of the seed-box down opposite the end of the disk-gang shaft $s$. A screw-bolt, $s'$, extends through this bar and enters a small recess, $s^2$, in the end of the shaft, as clearly shown in Fig. 7. By adjusting the clamp-nuts the thimble $r$ can be held in proper relation to the journal-bearings $r'$. The lateral thrust of the gang comes against the nut next the screw-bolt $s'$, and is thus transferred to the disk-gang shaft. The object of this bolt is to receive said thrust and relieve the bearings of the gang-shaft from the strain and friction caused by the lateral pressure of the disk-gang, and it can be tightened up, when necessary, to compensate wear. In practice, such a stop should be provided for each end of the shaft.

Immediately below the seed-box, and having its bearings at one end in the bar D′ and at the other in an ear, D², is a shaft, $u$. Suitable seed-wheels R, having recesses $q$ in their peripheries, are keyed to this shaft and turn with it. The bottom of the seed-box is perforated and cut out, as shown in Fig. 2, to fit the peripheries of the seed-wheels R, so that the recesses in the wheels, as they revolve, come opposite the openings in the seed-box, and thus discharge the seed, as illustrated in Figs. 10 and 11. In the bottom of the seed-box is a sliding cut-off plate, G, having openings $h$ corresponding to the openings in the bottom of the seed-box. By means of this plate, which is controlled by a lever, $i$, within reach of the driver, the seed may be cut off or allowed to fall, as may be desired. The shaft $u$ is in this instance shown as driven by means of a belt or chain extending from a cone-pulley, $u'$, thereon to a similar pulley, $u^2$, on the disk-gang shaft. By this mode of driving the seed-wheels the discharge of seed may be regulated, as desired, relatively to the speed of the machine.

The disks or cutters T are made with spokes, as shown in the drawings, and the cutting-rim, which is preferably about two inches deep, is made sharp on the edge, as shown in Fig. 4. The spokes and rims of these disks are hollowed out, as shown in Figs. 3 and 4, to secure strength and lightness.

The thimbles $r\ r'$ may be made with forked ends, one prong of each being arranged on the convex side of each spoke to brace it against the lateral pressure of the earth.

The disks may be so arranged on the shaft that the openings and spokes shall be in line; or they may be arranged in any manner best adapted to secure a thorough disintegration of the earth.

The neck-yoke M is pivoted to the draft-pole or tongue B so as to be free to swing horizontally, but be rigid vertically, to prevent the machine from tilting or overturning.

In Figs. 9, 10, and 12 is shown a modification of the mechanism for reversing the draft-frame and adjusting it at an angle to the cutters. The joint of the pole and cross-bar is set back of the center of the circular track, as shown in Fig. 9, so that the draft will come upon the two pulleys on the cross-bar. The pole is locked in position by means of a catch, $x$, pivoted in an upright, $y$, secured to the circular track. A coil-spring, $z$, tends to keep the catch down. As the pole comes around it snubs up the catch and is securely locked by it. This catch may be controlled by the foot of the driver by means of the heel-extension of the spring-latch. (Shown in Fig. 12.)

When the machine is being transported from one field to another the tongue is arranged at right angles to the disk-gang shaft, and there locked by means of the pin and stop, and the supporting-wheels W may be placed in their lowest position, so as to bear the weight of the machine and lift the disk-cutters clear of the ground. When, however, the machine is ready for work, the cutters are allowed to enter the ground to such depth as may be desired, this being controlled by the wheels W, the cutters entering the earth until the bearing-surfaces or treads $w^2$ of the wheels come in contact with the ground. The disk-gang shaft is arranged at any angle relatively to the line of draft, and this angle may be varied as desired by means of the circular track and locking-pin, a locking-stop being arranged on each side of the circular track, so as to secure the proper angle of the disk-cutters to the line of draft both during the forward and reverse movement of the machine.

As there is but one disk-gang and the disks are all arranged in one direction, it is desirable to counteract the tendency of the machine to move sidewise. This result is accomplished by the sharp flanges on the wheels W, which enter the ground and prevent any sidewise movement of the machine. Should the lateral thrust of the disk-cutters be very strong, however, it may be found necessary to shift the standards P, as hereinbefore explained, so as to incline the wheels W obliquely to the line of draft in a direction opposite to that of the disks, and thus counteract their lateral pressure more effectually.

When the machine has reached the ends of the furrows the draft-frame is reversed, as hereinbefore explained, the cutters and seed-box remaining stationary. The wheels W support the frame in a horizontal position during this movement, and these wheels also serve as markers to indicate the distance for guiding the team from the soil already sown.

The uprights or supports of the reversible frame are detachably secured thereon, as shown, and may be removed if desired, in which case the disks should be so shaped, as is well known in the art, as to cause the machine to run straight without the aid of any guides to counteract the lateral thrust of the gang. When the machine is thus organized, the neck-yoke, which is free to turn horizontally, but is held rigidly against vertical rocking, prevents the machine from tipping over when the pole comes in line with the disk-gang while the machine is being reversed.

The advantage of using a gang of spoked or perforated disks arranged at an angle to the line of draft and revolving together with a common axle is great and valuable, and, so far as I am aware, has never heretofore been attained. A clod or lump of hard earth, if struck by the foremost one of a gang of solid disks, would escape the gang without being broken further than when first struck, and when spoked disks have been used, so far as I am aware, they have each revolved independently of the others. This is, however, objectionable, as the action of the disks upon the soil is uncertain and not uniform, and they are incapable of adjustment relatively to each other. By my construction, however, the disks are made to revolve together with a common axle, and thus operate upon the soil in a uniform manner. They are also capable of being adjusted relatively to each other to secure the most perfect treatment required by varying conditions of the soil.

In the drawings the disks are shown so arranged that the spaces are in line. By this arrangement a clod of earth, when struck by one disk, will then be crowded through the spaces or openings in succeeding disks of the gang, and successively be struck by them and thoroughly pulverized.

By the organization herein described it will be noted that a force-feed is employed capable of working equally well in either direction; that the rate of feed can be varied, and that the feed mechanism is driven directly from the disk-gang shaft without interfering with the turning or reversal of the main frame, which latter straddles the seed-box and disk-gang to allow their free play beneath it.

I do not broadly claim herein the use of perforated or spoked disk-cutters; neither do I broadly claim a disk-gang adjustable to the line of draft; nor, broadly, the combination of a disk-gang with seeding mechanism mounted thereon; nor, broadly, driving the seeding mechanism from the gang-shaft; nor, broadly, the combination of a disk-gang with traveling or supporting wheels; nor, broadly, a rudder-wheel adjustable at varying angles to the line of draft, as all these devices are old and well known in the art.

I claim as of my own invention—

1. The combination, substantially as hereinbefore set forth, of a straddling main frame, a gang of disk-cutters adjustable relatively to the line of draft beneath said frame, and guides mounted on the frame to counteract the lateral thrust of the gang.

2. The combination, substantially as hereinbefore set forth, of a gang of disk-cutters adjustable relatively to the line of draft, a straddling main or draft frame, and guide-wheels on the frame adjustable relatively to the line of draft.

3. The combination, substantially as hereinbefore set forth, of a gang of disk-cutters and a reversible draft or main frame.

4. The combination, substantially as hereinbefore set forth, of a gang of disk-cutters, a reversible draft-frame, and supporting-wheels mounted upon said frame, whereby the frame is maintained in a horizontal position while being reversed.

5. The combination, substantially as hereinbefore set forth, of a gang of disk-cutters arranged to turn the earth in one direction, a reversible draft-frame, and mechanism for locking the frame in the same position relatively to the cutters during the forward as well as the reverse movement of the machine, whereby the furrows are turned in a uniform direction.

6. The combination, substantially as hereinbefore set forth, of a gang of revolving disk-cutters, a reversible draft-frame, a circular track upon which said frame turns, and mechanism for varying the gang relatively to the line of draft.

7. The combination, substantially as hereinbefore set forth, of a gang of disk-cutters, a reversible draft-frame, a circular track upon which said frame turns, movable stops adjustable upon the track, and a detent adapted to engage with said stops to lock the draft-frame in any desired position relatively to the disk-gang.

8. The combination, substantially as hereinbefore set forth, of a gang of disk-cutters, a circular track supported above the disk-gang, a straddling main frame above said track, and grooved pulleys depending from the main frame and embracing the edges of the track, said pulleys constituting a draft-connection between the track and frame.

9. The combination, substantially as hereinbefore set forth, of a straddling main or supporting frame, a seed-box supported beneath said frame, a disk-gang the shaft of which revolves in bearings depending from the seed-box, and mechanism, substantially such as described, for simultaneously adjusting the angle of the seed-box and disk-gang relatively to the frame and to the line of draft.

10. The combination, substantially as hereinbefore set forth, of a gang of disk-cutters, a seed-box, a series of seed-wheels constituting a forced feed capable of working either way, mechanism for driving said wheels in either direction directly from the disk-gang shaft, and a reversible frame, whereby the seed is distributed during the forward movement of the machine as well as during its reverse movement without interference from the reversal of the frame.

11. A gang or series of spoked or perforated disks mounted on a common axle, arranged to revolve together, substantially as described.

12. The combination, substantially as hereinbefore set forth, of the disk-gang shaft, a series of spoked or perforated disks mounted loosely thereon, collars or spacing-thimbles interposed between the disks, and clamping mechanism, whereby the spokes of the disks can be adjusted relatively to each other and the disks rigidly secured together on their shaft with which they turn.

In testimony whereof I have hereunto subscribed my name.

CHARLES LA DOW.

Witnesses:
J. J. JANSEN,
GEO. C. LEE.